3,472,834
PHENYLAZO-2,3-HYDROXYNAPHTHOIC ACID
AMIDES CONTAINING DIPHENYLUREAS
Karl Ronco, Riehen, and Armand Roueche, Neu-
Allschwil, Switzerland, assignors to Ciba Limited,
Basel, Switzerland, a company of Switzerland
No Drawing. Filed Mar. 28, 1966, Ser. No. 537,720
Claims priority, application Switzerland, Apr. 2, 1965,
4,588/65; Mar. 9, 1966, 3,376/66
Int. Cl. C07c *107/08*
U.S. Cl. 260—203                                  7 Claims

ABSTRACT OF THE DISCLOSURE

Compounds of the formula

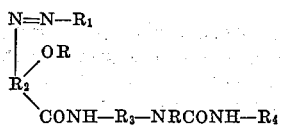

in which $R_1$ represents a benzene residue that may be substituted, $R_2$ represents a naphthalene residue in which the azo, hydroxy and carboxylic acid amide groups are in 1,2,3-position, $R_3$ represents a phenylene residue and $R_4$ represents an aryl, alkyl or aralkyl residue, are valuable monoazo pigments of superior migration fastness, useful in spin-dyeing of fibers and in the coloration of plastic masses.

---

The present invention provides valuable new monoazo pigments of the formula (1)    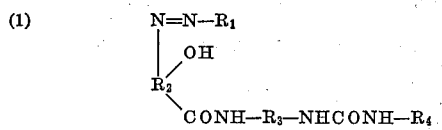

in which $R_1$ represents a benzene residue that may be substituted, $R_2$ represents a naphthalene residue in which the azo, hydroxy and carboxylic acid amide groups are in 1,2,3-position, $R_3$ represents a phenylene residue and $R_4$ represents an aryl, alkyl or aralkyl residue. More specifically, these compounds are those of the formula

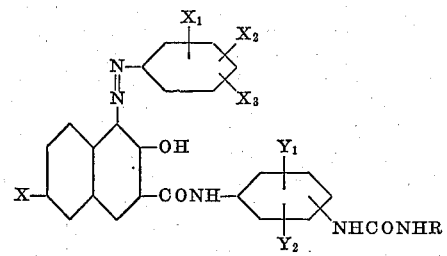

in which R is a member selected from the group consisting of lower alkyl, benzyl, phenyl and naphthyl and phenyl and naphthyl substituted by chlorine or bromine, lower alkyl, lower alkoxy, lower carbalkoxy, trifluoromethyl or lower alkanoylamino groups, X is a member selected from the group consisting of hydrogen, chlorine and bromine atoms and lower alkoxy groups, $X_1$ is a member selected from the group consisting of hydrogen, chlorine and bromine atoms, $X_2$ and $X_3$ each represent hydrogen, chlorine and bromine atoms, lower alkyl, lower alkoxy, phenoxy, nitro, cyano, lower carbalkoxy, carbophenylamido, lower alkanoylamino or trifluoromethyl groups, $Y_2$ and $Y_3$ each represent members selected from the group consisting of hydrogen, chlorine and bromine atoms, lower alkyl, trifluoromethyl, and lower alkoxy groups.

Of special interest are dyestuffs of the formula (2)    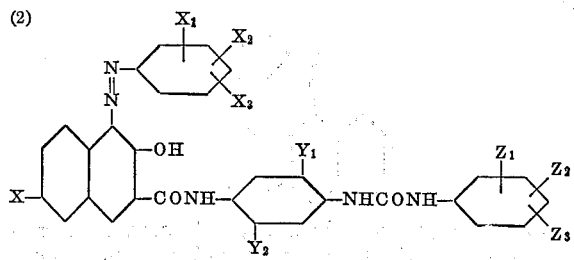

in which X represents a hydrogen or halogen atom or an alkoxy group, $X_1$ represents a hydrogen or halogen atom, $X_2$ and $X_3$ represent hydrogen or halogen atoms or alkyl, alkoxy, phenoxy, nitro, cyano, carbalkoxy, aliphatic acylamino, carbamido or trifluoromethyl groups, $Y_1$ and $Y_2$ represent hydrogen or halogen atoms or alkyl, trifluoromethyl or alkoxy groups, $Z_1$ represents a hydrogen or halogen atom and $Z_2$ and $Z_3$ represent hydrogen or halogen atoms or alkyl, alkoxy, nitro, cyano, carbalkoxy, aliphatic acylamino or trifluoromethyl groups, and dyestuffs of the formula (3)    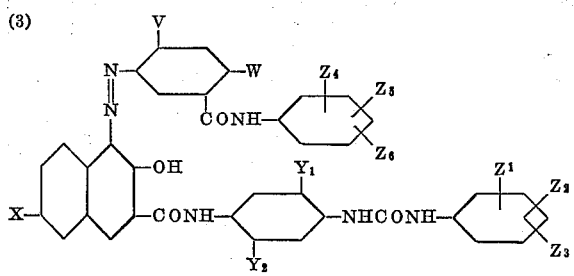

in which V represents a halogen atom or an alkyl, alkoxy or carbalkoxy group, W and $Z_4$ represent hydrogen or halogen atoms, $Z_5$ and $Z_6$ represent hydrogen or halogen atoms or alkyl, alkoxy, nitro, cyano, carbalkoxy or trifluoromethyl groups and $Y_1$, $Y_2$, $Z_1$, $Z_2$ and $Z_3$ have the meanings given above.

Because the products of the invention are pigments they must not contain groups imparting solubility in water in particular acidic groups imparting solubility in water, for example, sulphonic acid groups or carboxylic acid groups.

The new product may be obtained when (a) a carboxylic acid halide of the formula (4)    

in which $R_1$ and $R_2$ have the meanings given above, is condensed with a monamine of the formula

in which $R_3$ and $R_4$ have the meanings given above, or (b) a diazotized aminobenzene is coupled with a naphthol of the formula (5)    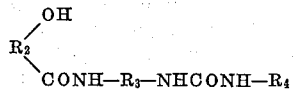

or (c) a diazotized aminobenzene is coupled with a naphthol of the formula (6)    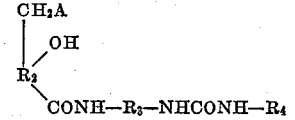

in which Formulae A represents the residue of an amine and $R_2$, $R_3$ and $R_4$ have the meanings given above.

Specially valuable pigments may be obtained when a carboxylic acid chloride of the formula (7)
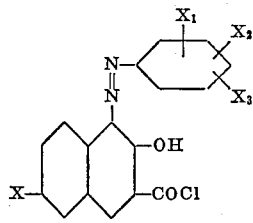

in which X represents a hydrogen or halogen atom or an alkoxy group, $X_1$ represents a hydrogen or halogen atom, and $X_2$ and $X_3$ represent hydrogen or halogen atoms or alkyl, alkoxy, phenoxy, nitro, cyano, carbalkoxy, carbamido, aliphatic acylamino or trifluoromethyl groups, is condensed with an amine of the formula (8)
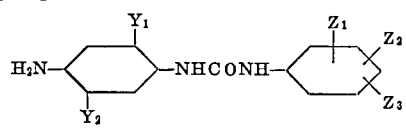

in which $Y_1$ and $Y_2$ each represents a hydrogen or halogen atom or an alkyl or alkoxy group, $Z_1$ represents a hydrogen or halogen atom and $Z_2$ and $Z_3$ each represent hydrogen or halogen atoms or alkyl, alkoxy, nitro, cyano, carbalkoxy, aliphatic acylamino or trifluoromethyl groups.

The carboxylic acids on which the halides are based may be obtained by coupling a diazo compound of an aminobenzene, especially one of the formula (9)
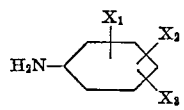

or one of the formula

(10)
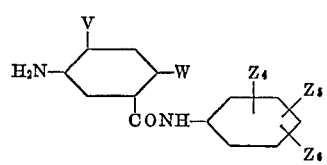

with a 2,3-hydroxynaphthoic acid, especially one of the formula

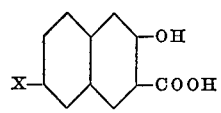

in which X represents a hydrogen or halogen atom or an alkoxy group.

As examples of aminobenzenes of the Formula 9 the following may be mentioned: aniline, and especially halogenated anilines, for example, 2-, 3- and 4-chloraniline, 3,4-dichloraniline, 2,3-dichloraniline, 2,4-dichloraniline, 2,5-dichloraniline, 2,6-dichloraniline, 2,4,5-trichloraniline, 2,4,6-trichloraniline, 2-, 3-, or 4-bromaniline, 2,4-dibromaniline, 2,5-dibromaniline, 2-methyl-5-chloraniline, 2-methyl-4-chloraniline, 2-methyl-3-chloraniline, 2-chloro-5-trifluoromethylanilinline, nitroanilines, for example, 2-, 3- and 4-nitraniline, 4-chloro-2-nitraniline, 2-chloro-4-nitraniline, 4-methyl-3-nitraniline, 2,4-dimethyl-3-nitraniline, 2-methyl-5-nitraniline, 2-methyl-4-nitraniline, alkoxyanilines and phenoxyanilines, for example, 2- and 4-methoxyaniline, 2- and 4-ethoxyaniline, 3-chloro-4-methoxyaniline, 2-methoxy-5-nitraniline, 2-methoxy-5-chloraniline, 2-methoxy-5-trifluoromethylaniline, 2-amino-4-trifluoromethyl-4'-chlorodiphenylether, 2-nitro-4-ethoxyaniline, 2-methoxy-4-chloro-5-methylaniline, 2-amino-4-chlorodiphenylether, 3-amino-2,4-dichlorodiphenylether, 2-amino-4,4'-dichlorodi-phenylether, 1-amino-2-carboxylic acid methylester, 1-amino-2-chloro-5-carboxylic acid methylester, 2-amino-5-nitrobenzoic acid methylester, 1-amino-2-methylbenzene-5-carboxylic acid methylester, 1-amino-2-chlorobenzene-5-carboxylic acid methylamide, 2-amino-4-trifluoromethyldiphenylether.

As examples of aminobenzenes of the Formula 10 the following may be mentioned:

4-methyl-3-aminobenzoic acid-2'-chloro-5'-trifluoromethylanilide,
4-chloro-3-aminobenzoic acid-2',5'-dichloroanilide,
4-chloro-3-aminobenzoic acid-2'-chloro-5'-carbomethoxyanilide,
4-chloro-3-aminobenzoic acid-3'-chloranilide,
4-chloro-3-aminobenzoic acid-2'-chloro-5'-trifluoromethylanilide,
4-chloro-3-aminobenzoic acid-3'-trifluoromethylanilide,
4-chloro-3-aminobenzoic acid-3',5'-bistrifluoromethylanilide,
4-chloro-3-aminobenzoic acid-2',4',5'-trichloranilide,
2,4-dichloro-5-aminobenzoic acid-2',5'-dichloranilide,
2,4-dichloro-5-aminobenzoic acid-2',4'-dichloranilide,
2,4-dichloro-5-aminobenzoic acid-3'-trifluoromethylanilide,
2,4-dichloro-5-aminobenzoic acid-3'-chloranilide,
5-amino-4-methoxy-2-chlorobenzoic acid-3'-trifluoromethylanilide,
4-methyl-3-aminobenzoic acid-2',5'-dichloranilide,
4-methyl-3-aminobenzoic acid-3'-trifluoromethylanilide,
4-methoxy-3-aminobenzoic acid-3'-chloranilide,
4-methoxy-3-aminobenzoic acid-2',5'-dichloranilide,
4-methoxy-3-aminobenzoic acid-2',4',5'-trichloranilide,
4-carbomethoxy-3-aminobenzoic acid anilide,
4-methoxy-3-aminobenzoic acid-3'-trifluoromethylanilide,
4-carbethoxy-3-aminobenzoic acid-2',5'-dichloranilide,
4-methoxy-3-aminobenzoic acid-3',5'-bis-trifluoromethylanilide,
4-methoxy-3-aminobenzoic acid-2'-chloro-5'-trifluoromethylanilide,
4-methoxy-3-aminobenzoic acid-2',5'-dimethoxy-4'-chloranilide,
4-methoxy-3-aminobenzoic acid-2',5'-dimethyl-4'-chloranilide.

The azo dyestuff carboxylic acids obtained may be treated with agents capable of converting carboxylic acids into their halides, for example, their chlorides or bromides, such agents being, in particular, phosphorus halides, for example, phosphorus pentabromide, phosphorus trichloride, phosphorus pentachloride, phosphorus oxyhalides and preferably thionyl chloride.

The treatment with such acid halogenating agents is advantageously carried out in an inert organic solvent, for example, dimethylformamide, a chlorobenzene, for example, monochlorobenzene or dichlorobenzene, toluene, xylene or nitrobenzene; the last five solvents may be used together with dimethylformamide.

When preparing the carboxylic acid halides it is generally advantageous first to dry the azo compounds which have been prepared in aqueous medium, or to free them from water by azeotropic distillation in an organic solvent; if desired, azeotropic drying may be carried out immediately prior to the treatment with the acid halogenating agents.

The azo dyestuff carboxylic acid chlorides obtained are advantageously condensed with monamines of the Formula 8. The following amines are examples:

4-aminodiphenylurea,
4-amino-4'-chlorodiphenylurea,
4-amino-4'-methyl-diphenylurea,
4-amino-4'-methoxdiphenylurea,
4-amino-2-methyldiphenylurea,
4-amino-3-methyldiphenylurea,
4-amino-2-chlorodiphenylurea, 4-amino-2,5-dimethyldiphenylurea,
4-amino-2,5-dimethyl-4'-chlorodiphenylurea,
4-amino-2,5,4'-trimethyldiphenylurea,
4-amino-2,5-dichlorodiphenylurea,
4-amino-2,5,4'-trichlorodiphenylurea,
4-amino-2-methyl-5-chlorodiphenylurea,
4-amino-2-methoxy-5-chlorodiphenylurea,
4-amino-2-methoxy-5,4'-dichlorodiphenylurea,
4-amino-2,5-dichloro-4'-methoxydiphenylurea,
4-amino-2,4-dichlorodiphenylurea,
4-amino-2-chloro-3'-trifluoromethyldiphenylurea,
4-amino-2,5-dimethyl-2'-methoxy-4'-chlorodiphenylurea,
4-amino-2,5-(dimethylphenyl)-α-naphthylurea,
4-amino-2,5-(dichlorophenyl)-β-naphthylurea,
4-aminophenyl-α-naphthylurea,
4-amino-2-methylphenyl-α-naphthylurea,
4-amino-2,5-dimethyl-3'-chlorodiphenylurea,
4-amino-2,5-dimethyl-4'-methoxydiphenylurea,
4-amino-2,5-dimethyl-4'-methyldiphenylurea,
4-amino-2,5-dichloro-3'-chlorodiphenylurea,
4-amino-2,5-dichloro-4'-methyldiphenylurea,
4-amino-5-methoxy-2-chlorodiphenylurea,
3-amino-4,2'-dichloro-5'-trifluoromethyldiphenylurea,
3-amino-4,2'-dichloro-5'-carbomethoxydiphenylurea,
3-amino-4,2',5'-trichlorodiphenylurea,
4-amino-3'-trifluoromethyldiphenylurea,
4-amino-2'-chloro-5'-trifluoromethyldiphenylurea,
4-amino-2'-chloro-5'-carbomethoxydiphenylurea,
4-amino-2',5'-dichlorodiphenylurea,
4-amino-4'-methoxydiphenylurea,
4-amino-4'-acetylaminodiphenylurea,
4-amino-4'-carbomethoxydiphenylurea,
4-amino-2',4'-dichlorodiphenylurea,
4-amino-2,5-dimethoxydiphenylurea,
4-amino-2,5-dimethoxy-4'-chlorodiphenylurea,
4-amino-2,5-dimethylphenyl-benzylurea,
4-aminophenylbenzylurea,
4-aminophenylbutylurea,
4-aminophenylmethylurea,
4-amino-5-chloro-2-methoxy-4'-acetylaminodiphenylurea,
4-amino-2,5-dimethyl-4'-acetylaminodiphenylurea,
4-amino-5-chloro-2-methoxyphenylmethylurea,
4-amino-2,5-dimethylphenylmethylurea,
4-amino-2,5-dichlorophenylmethylurea,
4-amino-2',4',5'-trichloro-2-methoxydiphenylurea
and 4-amino-2-methylphenylmethylurea.

The condensation of the carboxylic acid halides of the kinds defined above with the amines is advantageously carried out in an anhydrous medium. Under these conditions, condensation proceeds surpringly easily, even at temperatures within the boiling range of the common organic solvents, for example, toluene, monochlorobenzene, dichlorobenzene, trichlorobenzene, nitrobenzene and the like. It is generally advantageous to use an agent capable of binding acid, for example, anhydrous sodium acetate or pyridine, in order to accelerate the reaction. Some of the pigments obtained are crystalline and some are amorphous. They are generally obtained in very good yield and in a pure state. It is advantageous first of all to isolate the acid chlorides obtained from the carboxylic acids. In some cases, however, isolation of the acid chlorides can be dispensed with without harm, and condensation carried out immediately after the preparation of the carboxylic acid chlorides.

In method (b) of the process of the invention the new products may be obtained when a diazotized aminobenzene, especially one of the Formula 9 or 10, is coupled with a naphthol of the Formula 5, especially one of the formula (11)

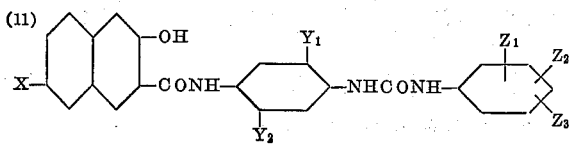

in which X, $Y_1$, $Y_2$, $Z_1$, $Z_2$ and $Z_3$ have the meanings given about.

Coupling is effected by the gradual addition of the aqueous alkaline solution of the coupling component to the acid solution of the diazonium salt. The alkali hydroxide required to dissolve the coupling component is advantageously used in an amount sufficient to neutralize the mineral acid liberated from the diazonium salt during coupling. Coupling is advantageously carried out at a pH value of 4 to 6. The pH is advantageously adjusted by the addition of a buffer. Suitable buffers are, for example, the salts especially the alkali metal salts, of formic acid, phosphoric acid or especially acetic acid. The alkaline solution of the coupling component advantageously contains a wetting, dispersing or emulsifying agent, for example, an aralkylsulphonate, for example, dodecylbenzene sulphonate or the sodium salt of 1,1'-naphthylmethane sulphonic acid, polycondensation products of alkylene oxides, for example, the product obtained by reacting ethylene oxide with para-tertiary-octylphenol, and also alkyl esters of sulphoricinoleates, for example, n-butyl-sulphoricinoleate. The dispersion of the coupling component may also advantageously contain a protective colloid, for example, methylcellulose or small amounts of inert organic solvents that are sparingly soluble or insoluble in water, for example, aromatic hydrocarbons that may be halogenated or nitrated, for example, benzene, toluene, xylene, chlorobenzene, dichlorobenzenes or nitrobenzene, as well as aliphatic halogenated hydrocarbons, for example, carbon tetrachloride or trichloroethylene, and organic solvents miscible with water, for example, acetone, methylethylketone, methanol, ethanol and isopropanol.

Coupling may also advantageously be carried out in a manner such that an acidic solution of the diazonium salt is continuously combined with an alkaline solution of the coupling component in a mixing nozzle, in which process coupling takes place instantaneously. Care must be taken to ensure that diazo solution and coupling component are present in the mixing nozzle in equimolecular proportions, it being advantageous to provide for a small excess of coupling component. The simplest method of doing this is to control the pH of the liquid in the mixing nozzle. It is also important to ensure that both solutions are in a state of turbulence in the mixing nozzle. The pigment dispersion so formed is continuously drawn off from the mixing nozzle and the pigment is isolated by filtration.

In method c of the process of the invention, the new pigments may be obtained by coupling a diazotized aminobenzene, especially one of the Formula 9, with a naphthol of the Formula 6, in which A preferably represents the residue of an amine of the formula

in which $R_5$ represents a hydrogen atom or an alkyl residue and $R_6$ represents an alkyl residue, and in which the residues $R_5$ and $R_6$, together with the nitrogen atom, may form a heterocyclic ring. As examples there may be mentioned the residues of methylamine, dimethylamine, diethylamine, diethanolamine, pyrrolidine, piperidine and morpholine. The compounds of the Formula 6 are obtainable by reacting the compounds of the Formula 5 with formaldehyde and a primary or secondary amine.

The residue —$CH_2A$ is split off during the coupling process and replaced by the azo group. Coupling is advantageously carried out in an acid medium.

The new products are valuable pigments and can be used for a very wide variety of purposes. For example, they may be used in a state of fine division for the spin-dyeing of filament and staple-fibre viscose rayon, cellulose ethers and esters, polyamides, polyurethanes, and polyesters, as well as in the preparation of coloured lacquers and as lake formers. They may also be used for colouring solutions and products made from cellulose acetate, nitrocellulose, natural resins and synthetic resins, for example polymerisation or condensation resins, for example, aminoplasts, alkyd resins, phenoplasts, polyolefines, for example, polystyrene, polyvinyl chloride, polyethylene, polypropylene, polyacrylonitrle, rubber, casein, silicones and silicone resins. They can also be used with advantage in the preparation of coloured pencils, cosmetic preparations and laminated sheet material.

Compared with the products described in French patent specification No. 784,220, which contain a benzoylamino group instead of the ureido group, the pigments obtainable by the process of the present invention are distinguished by a better fastness to migration.

The following examples illustrate the invention. Unless otherwise stated, the parts and percentages are by weight.

EXAMPLE 1

84 parts of the dyestuff obtained by diazotising 5 trifluoromethyl-2-chloro-1-aminobenzene in aqueous hydrochloric acid with sodium nitrite and coupling with 2,3-hydroxynaphthoic acid are heated with 1,500 parts of benzene, 35 parts of thionyl chloride and 2 parts of dimethylformamide for one hour at 75 to 80° C. while stirring. After cooling the reaction mixture, the uniformly crystalline mono-carboxylic acid chloride of the dyestuff is isolated by filtration, washed with cold benzene and then dried in vacuo at 50 to 60° C.

8.3 parts of the chloride so obtained are heated for 12 hours at 140 to 145° C. with 5.5 parts of N-(2,5-dimethyl-4-amino)-phenyl-N'-phenylurea and 800 parts of ortho-dichlorobenzene. Subsequently, the sparingly soluble pigment, which is in the form of fine crystals, is isolated by filtration while hot, washed with hot ortho-dichlorobenzene, alcohol and hot water, and then dried in vacuo at 70 to 80° C. The product so obtained of the formula

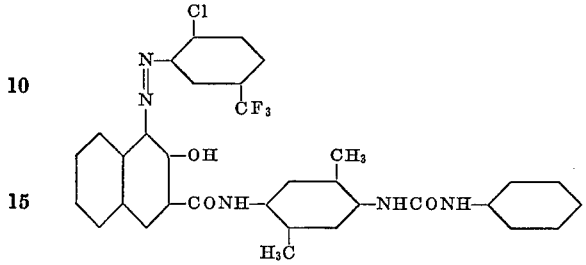

is a red pigment which is sparingly soluble to insoluble in the common solvents and which colours polyvinyl chloride film and lacquers scarlet red tints possessing an excellent fastness to light, migration and overstripe bleeding.

The azo dyestuff monocarboxylic acids, obtainable from the mononuclear diazo components listed in column I of the following table and the coupling components listed in column II, can be reacted via the monoazo dyestuff monocarboxylic acid chlorides with 1 mol of the aromatic monamines containing urea groups listed in column III in the manner described in the first and second paragraphs of this example. Column IV indicates the tints obtainable with the pigments in polyvinyl chloride film.

| | I | II | III | IV |
|---|---|---|---|---|
| 1 | 2-methoxy-5-trifluoromethylaniline | 2,3-hydroxynaphthoic acid | 4-amino-2,5-dimethyldiphenylurea | Red. |
| 2 | 2-chloro-5-trifluoromethylaniline | do | 4-amino-2,5,4'-trimethyldiphenylurea | Red. |
| 3 | do | do | 4-amino-2,5-dimethyl-4'-chlorodiphenylurea | Red. |
| 4 | do | do | 4-amino-2,5-dimethyl-3'-chlorodiphenylurea | Red. |
| 5 | do | do | 4-amino-2-methyldiphenylurea | Red. |
| 6 | do | do | 4-amino-2-methyl-4'-chlorodiphenylurea | Red. |
| 7 | do | do | 4-amino-2,5,4'-trichlorodiphenylurea | Red. |
| 8 | do | do | 4-amino-2,5-dichloro-4'-methoxydiphenylurea | Red. |
| 9 | do | do | 4-amino-2,5,3'-trichlorodiphenylurea | Red. |
| 10 | do | do | 4-amino-2,5-dichlorodiphenylurea | Red. |
| 11 | do | do | 4-amino-4'-chlorodiphenylurea | Red. |
| 12 | do | do | 4-aminodiphenylurea | Red. |
| 13 | do | do | 4-amino-4'-methoxydiphenylurea | Red. |
| 14 | do | do | 4-amino-2-methoxy-5-chlorodiphenylurea | Red. |
| 15 | do | do | 4-amino-2-methoxy-5,4'-dichlorodiphenylurea | Orange. |
| 16 | 2,5-dichloraniline | do | 4-amino-2,5,4'-trichlorodiphenylurea | Red. |
| 17 | do | do | 4-amino-2,5,4'-trimethyldiphenylurea | Red. |
| 18 | do | do | 4-amino-5-methoxy-2-chlorodiphenylurea | Red. |
| 19 | do | do | 4-amino-2,5,3'-trichlorodiphenylurea | Red. |
| 20 | do | do | 4-amino-2,5-dimethyl-4'-methoxydiphenylurea | Red. |
| 21 | do | do | 4-amino-2,5-dimethyl-4'-chlorodiphenylurea | Red. |
| 22 | do | do | 4-amino-2,5-dimethyl-2'-methoxy-4'-chlorodiphenylurea. | Red. |
| 23 | do | do | 4-aminodiphenylurea | Red. |
| 24 | do | do | 4-amino-5-chloro-2-methoxydiphenylurea | Red. |
| 25 | do | do | 4-amino-2,5-dimethyldiphenylurea | Red. |
| 26 | do | do | 4-amino-2,4'-dichlorodiphenylurea | Red. |
| 27 | do | do | 4-amino-2,5-dichlorophenylmethylurea | Red. |
| 28 | do | do | 4-amino-2,5-dimethylphenylmethylurea | Red. |
| 29 | do | do | 4-amino-2-chloro-5-methoxyphenylmethylurea | Red. |
| 30 | do | do | 4-aminophenylmethylurea | Brown. |
| 31 | do | do | 4-amino-2,5-dimethylphenylbenzylurea | Red. |
| 32 | do | do | 4-amino-2-methoxy-2',4',5-trichlorodiphenylurea | Scarlet. |
| 33 | do | do | 4-amino-3'-trifluoromethyldiphenylurea | Orange. |
| 34 | do | do | 4-amino-2',4'-dichlorodiphenylurea | Do. |
| 35 | do | do | 4-amino-4'-methoxydiphenylurea | Red. |
| 36 | do | do | 4-amino-2',5'-dichlorodiphenylurea | Orange. |
| 37 | 2-methyl-5-chloraniline | do | 4-amino-4'-chlorodiphenylurea | Red. |
| 38 | 2-chloro-5-carbomethoxyaniline | do | 4-amino-2,5-dimethyldiphenylurea | Red. |
| 39 | do | do | 4-amino-2-methoxy-5,4'-dichlorodiphenylurea | Brownish red. |
| 40 | do | do | 4-amino-4'-chlorodiphenylurea | Red. |
| 41 | do | do | 4-aminodiphenylurea | Red. |
| 42 | 2-chloro-4-nitraniline | do | 4-amino-2,5-dichlorodiphenylurea | R3d. |
| 43 | do | do | 4-amino-2-chloro-5-methoxydiphenylurea | Red. |
| 44 | do | do | 4-amino-2,5-dimethyldiphenylurea | Red. |
| 45 | 2-nitro-4-chloraniline | do | 4-amino-4'-chlorodiphenylurea | Red. |
| 46 | 2,4,5-trichloraniline | do | do | Brownish red. |
| 47 | do | do | 4-amino-2,5-dimethyldiphenylurea | Red. |
| 48 | do | do | 4-amino-2,5-dichlorodiphenylurea | Red. |
| 49 | do | do | 4-aminophenyl-α-naphthylurea | Scarlet. |
| 50 | do | do | 4-amino-2,5,4'-trichlorodiphenylurea | Brown. |
| 51 | do | do | 4-amino-2-methoxy-5-chlorodiphenylurea | Do. |
| 52 | 2-methyl-3-chloraniline | do | 4-amino-2,5,4'-trichlorodiphenylurea | Red. |
| 53 | 2-carbomethoxy-4-nitraniline | do | do | Red. |
| 54 | do | do | 4-amino-2,5-dimethyl-4-chlorodiphenylurea | Brownish red. |
| 55 | do | do | 4-amino-2-methyl-4'-chlorodiphenylurea | Red. |
| 56 | 2-methoxy-4-chloro-5-methylaniline | do | do | Bluish red. |
| 57 | 3-amino-4-chlorobenzoic acid-monomethylamide. | do | 4-amino-2,5-dimethyldiphenylurea | Red. |

| | I | II | III | IV |
|---|---|---|---|---|
| 58 | do | do | 4-amino-2-methyl-4'-chlorodiphenylurea | Red. |
| 59 | 2-methoxy-5-carbomethoxyaniline | do | 4-amino-2-methoxy-5,4'-dichlorodiphenylurea | Red. |
| 60 | do | do | 4-amino-4'-chlorodiphenylurea | Red. |
| 61 | do | do | 4-amino-2,5-dimethyldiphenylurea | Red. |
| 62 | do | do | 4-amino-2-methyl-4'-chlorodiphenylurea | Red. |
| 63 | do | do | 4-amino-2,5,4'-trichlorodiphenylurea | Red. |
| 64 | do | do | 4-amino-2,5-dichlorodiphenylurea | Red. |
| 65 | do | do | 4-amino-4'-methyldiphenylurea | Red. |
| 66 | do | do | 4-amino-2-chloro-5-methoxydiphenylurea | Red. |
| 67 | Meta-chloraniline | do | 4-amino-2,5,4'-trichlorodiphenylurea | Red. |
| 68 | do | do | 4-amino-2,5-dimethyl-4'-chlorodiphenylurea | Red. |
| 69 | 2-phenoxy-5-trifluoromethylaniline | do | 4-amino-4'-chlorodiphenylurea | Red. |
| 70 | do | do | 4-amino-2-methoxy-5,4'-dichlorodiphenylurea | Red. |
| 71 | do | do | 4-amino-2,5-dichlorodiphenylurea | Red. |
| 72 | do | do | 4-aminodiphenylurea | Red. |
| 73 | do | do | 4-amino-2,5,4'-trimethyldiphenylurea | Orange. |

EXAMPLE 2

31.6 parts of 4 - chloro - 3 - aminobenzoic acid-(2',5'-dichloro) - phenylamide are suspended in 150 parts of glacial acetic acid; 30 parts of 30% hydrochloric acid are added and diazotization is carried out at 0 to 5° C. with 28.5 parts of 4 N sodium nitrite solution. After 30 minutes, the batch is diluted with 300 parts of ice water, filtered, and the clear diazo solution is run into a solution of 18.8 parts of 2,3 - hydroxynaphthoic acid in 300 parts of water and 14 parts of 30% sodium hydroxide solution at 10 to 15° C.; sodium carbonate solution is added at the same time, the pH value being kept at 8 to 8.5. After coupling, the batch is rendered acid to congo paper with hydrochloric acid, suction-filtered, washed free from acid and dried.

10.3 parts of the monoazo dyestuff monocarboxylic acid so prepared are heated for two hours at 110 to 115° C., while stirring with 400 parts of ortho-dichlorobenzene, 4 parts of thionyl chloride and 0.5 parts of dimethylformamide. After cooling the reaction mixture, the uniformly crystalline monocarboxylic acid chloride of the dyestuff is isolated by filtration, washed with cold ortho-dichlorobenzene and benzene and then dried in vacuo at 50 to 60° C.

10.7 parts of this acid chloride are heated for 14 hours at 140 to 145° C. with 5.5 parts of N-(2,5-dimethyl-4-amino)-phenyl-N'-phenylurea and 800 parts of ortho-dichlorobenzene. Subsequently, the crystalline, sparingly soluble pigment is isolated by filtration while hot, washed with hot ortho-dichlorobenzene, alcohol and hot water, and dried in vacuo at 70 to 80° C. The product so obtained of the formula

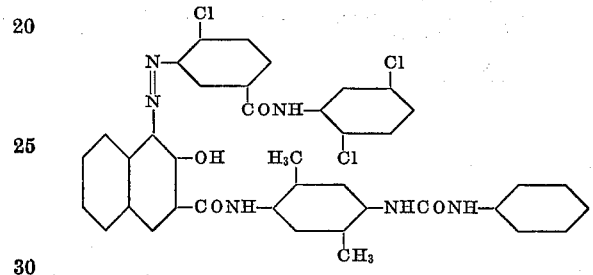

is a red pigment which is sparingly soluble to insoluble in the common solvents and which colours polyvinyl chloride films and lacquers red tints having an excellent fastness to light, migration and overstripe bleeding.

The monoazo dyestuff monocarboxylic acid chlorides, obtainable from the binuclear diazo components listed in column I of the following table and the coupling components listed in column II, can be reacted with 1 mol of the aromatic monamines containing urea groups listed in column III in the manner described in the first, second and third paragraphs of this example. Column IV indicates the tints obtainable with the pigments in polyvinyl chloride film.

| | I | II | III | IV |
|---|---|---|---|---|
| 1 | 4-chloro-3-aminobenzoic acid-(2',5'-dichloro)-anilide. | 2,3-hydroxynaphthoic acid | 4-amino-2,4'-dichloro-5-methoxydiphenylurea | Red. |
| 2 | do | do | 4-aminodiphenylurea | Red. |
| 3 | do | do | 4-amino-2-chloro-5-methoxydiphenylurea | Red. |
| 4 | do | do | 4-amino-2,5-dimethyldiphenylurea | Red. |
| 5 | do | do | 4-amino-2,4'-dichlorodiphenylurea | Red. |
| 6 | do | do | 4-amino-2,5,4'-trimethyldiphenylurea | Red. |
| 7 | do | do | 4-amino-4,2'-dichloro-5'-trifluoromethyl-diphenylurea. | Orange. |
| 8 | do | do | 4-amino-2,5-dichloro-4'-methoxydiphenylurea | Red. |
| 9 | 4-methyl-3-aminobenzoic acid-(2',5'-dichloro)-anilide. | do | 4-amino-2,5-dimethyldiphenylurea | Red. |
| 10 | do | do | 4-amino-2,5-dichlorodiphenylurea | Red. |
| 11 | do | do | 4-amino-2,5,4'-trimethyldiphenylurea | Red. |
| 12 | do | do | 4-amino-2-chloro-5-methoxydiphenylurea | Red. |
| 13 | do | do | 4-amino-5,4'-dichloro-2-methoxydiphenylurea | Red. |
| 14 | 4-methoxy-3-aminobenzoic acid-(3'-trifluoromethyl)-anilide. | do | 4-aminodiphenylurea | Bluish red. |
| 15 | do | do | 4-amino-2,5-dimethyl-4'-chlorodiphenylurea | Do. |
| 16 | do | do | 4-amino-2,5-dimethyl-4'-methoxydiphenylurea | Do. |
| 17 | do | do | 4-amino-2,5-dichlorodiphenylurea | Do. |
| 18 | do | do | 4-amino-2,5,4'-trichlorodiphenylurea | Do. |
| 19 | do | do | 4-amino-2,5-dimethyldiphenylurea | Do. |
| 20 | do | do | 4-amino-2-methoxy-5-chlorodiphenylurea | Do. |
| 21 | 4-chloro-3-aminobenzoic acid-(2'-chloro-5'-carbomethoxy)-anilide. | do | 4-amino-2,5-dichloro-4'-methoxydiphenylurea | Red. |
| 22 | do | do | 4-amino-4'-chlorodiphenylurea | Red. |
| 23 | do | do | 4-aminodiphenylurea | Red. |
| 24 | do | do | 4-amino-2,5,4'-trichlorodiphenylurea | Red. |
| 25 | do | do | 4-amino-2-methyldiphenylurea | Red. |
| 26 | do | do | 4-amino-2,3'-dichlorodiphenylurea | Red. |
| 27 | 4-chloro-3-amonobenzoic acid-(2'-chloro-5'-trifluoromethyl)-anilide. | do | 4-amino-2-methoxy-5,4'-dichlorodiphenylurea | Red. |
| 28 | do | do | 4-aminodiphenylurea | Red. |
| 29 | do | do | 4-amino-2,5-dichlorodiphenylurea | Red. |
| 30 | do | do | 4-amino-4-methoxydiphenylurea | Red. |
| 31 | do | do | 4-amino-2,5-dimethyldiphenylurea | Red. |
| 32 | 4-chloro-3-aminobenzoic acid-(5'-trifluoromethyl)-anilide. | do | 4-amino-2,5-dichlorodiphenylurea | Red. |
| 33 | do | do | 4-aminodiphenylurea | Red. |
| 34 | do | do | 4-amino-4'-chlorodiphenylurea | Red. |
| 35 | do | do | 4-amino-2-methyl-4'-chlorodiphenylurea | Red. |
| 36 | 3-nitro-4-aminobenzoic acid-(2',5'-dichloro)-anilide. | do | 4-aminodiphenylurea | Red. |

| | I | II | III | IV |
|---|---|---|---|---|
| 37 | 4,6-dichloro-3-aminobenzoic acid-(2',4'-dichloro)-anilide. | do | 4-amino-2,5-dimethyldiphenylurea | Red. |
| 38 | do | do | 4-amino-2-methoxy-5-chlorodiphenylurea | Red. |
| 39 | do | do | 4-amino-2',4'-dichlorodiphenylurea | Red. |
| 40 | 4-methyl-3-aminobenzoic acid-(2'-chloro-5'-trifluoromethyl)-anilide. | do | 4-amino-2-methoxy-5-chlorodiphenylurea | Red. |
| 41 | do | do | 4-amino-2',4'-dichlorodiphenylurea | Red. |
| 42 | do | do | 4-amino-2,5-dimethoxydiphenylurea | Red. |
| 43 | do | do | 4-amino-4'-carbomethoxydiphenylurea | Red. |
| 44 | do | do | 4-amino-2,5-dimethylphenyl-methylurea | Red. |
| 45 | 4-methyl-3-aminobenzoic acid-(3'-trifluoromethyl)-anilide. | do | 4-amino-4'-methoxydiphenylurea | Red. |
| 46 | do | do | 4-amino-2-methoxy-5-chlorodiphenylurea | Red. |
| 47 | do | do | 4-amino-2,5-dimethyldiphenylurea | Red. |
| 48 | do | do | 4-amino-2,5-dichlorodiphenylurea | Red. |
| 49 | 2,5-dichloroaniline | 7-bromo-3-hydroxy-2-naphthoic acid. | 4-amino-2,5-4'-trichlorodiphenylurea | Red. |
| 50 | do | do | 4-amino-2,5-dimethyldiphenylurea | Bluish red. |
| 51 | 2-chloro-5-trifluoromethylaniline | 7-methoxy-3-hydroxy-2-naphthoic acid. | 4-amino-2,5-dichlorodiphenylurea | Do. |
| 52 | do | do | 4-amino-2,5-dimethyldiphenylurea | Do. |
| 53 | 4-carbomethoxy-3-aminobenzoic acid | 2,3-hydroxynaphthoic acid | 4-amino-4'-chlorodiphenylurea | Red. |
| 54 | 4-carbethoxy-3-aminobenzoic acid-2',5'-dichloranilide. | do | 4-amino-2,5-dimethyl-4'-chlorodiphenylurea | Red. |
| 55 | 4-methoxy-3-aminobenzoic acid-(3'-trifluoromethyl)-anilide. | 7-bromo-3-hydroxy-2-naphthoic acid. | do | Bluish red. |
| 56 | do | do | 4-amino-2-methoxy-4',5-dichlorodiphenylurea | Do. |
| 57 | do | do | 4-amino-2',4'-dichlorodiphenylurea | Do. |

EXAMPLE 3

16.2 arts of 2,5-dichloro-1-aminobenzene are diazotized in the usual manner with aqueous hydrochloric acid, ice and sodium nitrite.

40 parts of N'-[4'-(2''-hydroxy-3''-naphthoylamino)-phenyl]-N-phenylurea are dissolved cold in a mixture of 200 parts of ethyleneglycol monoethylether and 20 parts of 30% sodium hydroxide solution. 1 part of the condensation product obtained from 8 mols of ethylene oxide and 1 mol of paratertiary-actylphenol is added to the solution and subsequently the naphthol is precipitated with 250 parts of 30% acetic acid while stirring well. Coupling is effected by addition of the diazo solution obtained as described in the preceding paragraph at a temperature of 30 to 35° C. while maintaining the pH at 5 to 6. Coupling is completed by stirring the batch at the same temperature for 2 hours, whereupon the pigment suspension formed is rendered acidic to congo paper by the addition of hydrochloric acid and filtered. The filter residue is washed with hot water until chlorine ions are no longer detectable in the filtrate. The residue is dried in vacuo at 80 to 90° C. and the red pigment of the formula

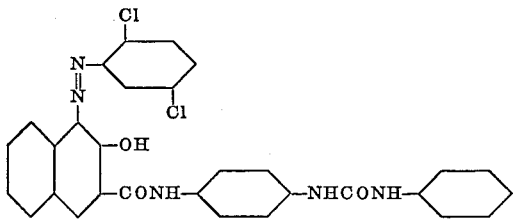

is obtained in good yield. It is sparingly soluble to insoluble in the common solvents and colours polyvinyl chloride film as well as lacquers scarlet tints possessing good fastness to migration, overstripe bleeding and light.

EXAMPLE 4

23.3 parts of 4-methoxy-3-aminobenzoic acid-(3'-trifluoromethyl)-anilide are dissolved warm in 45 parts of glacial acetic acid and diazotized in the usual manner with aqueous hydrochloric acid, ice and sodium nitrite.

36.5 parts of N'-[2',5'-dimethyl-4'-(2''-hydroxy-3''-naphthoylamine)-phenyl] - N - (4-chlorophenyl) - urea are dissolved cold in a mixture of 80 parts of ethyleneglycol monoethylether and 66 parts of 30% sodium hydroxide solution. The two solutions, if desired, after dilution with water, are conducted continuously to a mixing nozzle where coupling takes place instantaneously. The pH value in the mixing nozzle is kept at between 5 and 6 by regulating the supply of the solutions. The temperature must be between 35 and 40° C. This can be regulated by the addition of water to the solutions of the components. The dyestuff suspension formed is filtered and the filter residue is washed. The residue is then stirred in a mixture comprising 110 parts of ethyleneglycol monoethylether and 100 parts of ortho-dichlorobenzene and the whole is filtered hot. The filter residue is washed successively with ethyleneglycol monoethylether and methanol and then dried in vacuo at 70 to 80° C. The product, which is obtained in almost quantitative yield, corresponds to the formula

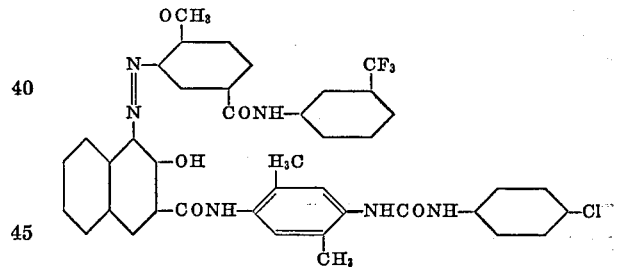

It is a bluish red pigment which is sparingly soluble to insoluble in the common solvents and which colours polyvinyl chloride film bluish red tints possessing an excellent fastness to light and migration.

EXAMPLE 5

A mixture is prepared from 65 parts of stabilized polvinyl chloride, 35 parts of dioctyl phthalate and 0.2 part of the pigment obtained in the manner described in the second paragraph of Example 1. The mixture so prepared is then worked to and fro for 7 minutes at 140° C. on a two-roller mill. A scarlet red film possessing a very good fastness to light and migration is obtained.

What is claimed is:

1. A monoazo pigment of the formula

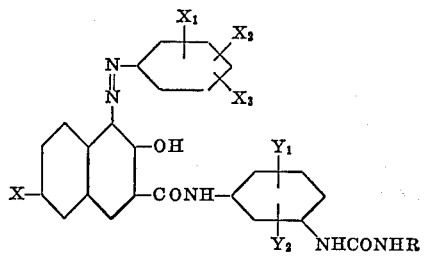

in which R is a member selected from the group consisting of lower alkyl, benzyl, phenyl and naphthyl and phenyl and naphthyl substituted by chlorine or bromine, lower alkyl, lower alkoxy, lower carbalkoxy, trifluoromethyl or lower alkanoylamino groups, X is a member selected from the group consisting of hydrogen, chlorine and bromine atoms and lower alkoxy groups, $X_1$ is a member selected from the group consisting of hydrogen, chlorine and bromine atoms, $X_2$ and $X_3$ each represent hydrogen, chlorine and bromine atoms, lower alkyl, lower alkoxy, phenoxy, nitro, cyano, lower carbalkoxy, carbophenylamido, lower alkanoylamino or trifluoromethyl groups, $Y_2$ and $Y_3$ each represent members selected from the group consisting of hydrogen, chlorine and bromine atoms, lower alkyl, trifluoromethyl, and lower alkoxy groups.

2. A monoazo pigment as claimed in claim 1 of the formula

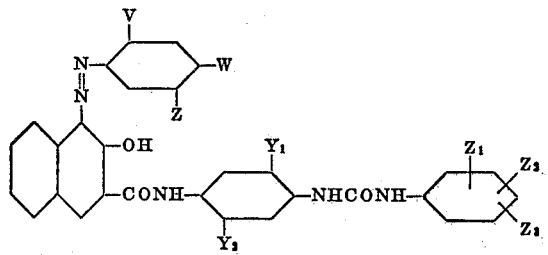

in which V is a member selected from the group consisting of a chlorine atom, a lower alkyl, lower alkoxy, and lower carbalkoxy group, W is a member selected from the group consisting of hydrogen and chlorine atoms and Z is a member selected from the group consisting of chlorine atoms, lower carbalkoxy groups and the group of the formula

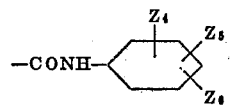

in which $Z_4$ is a member selected from the group consisting of hydrogen, chlorine and bromine atoms, $Z_5$ and $Z_6$ represent members selected from the group consisting of hydrogen, chlorine and bromine atoms, lower alkyl, lower alkoxy, lower carbalkoxy, nitro, cyano and trifluoromethyl groups, $Z_1$ is a member selected from the group consisting of hydrogen, chlorine and bromine atoms, $Z_2$ and $Z_3$ represent members selected from the group consisting of hydrogen, chlorine and bromine atoms, lower alkyl, lower alkoxy, lower carbalkoxy, nitro, cyano, trifluoromethyl and lower alkanoylamino groups.

3. The dystuff as claimed in claim 1 of the formula

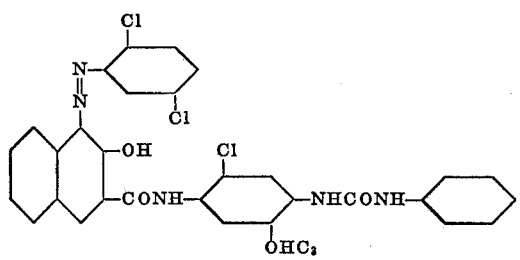

4. The dyestuff as claimed in claim 1 of the formula

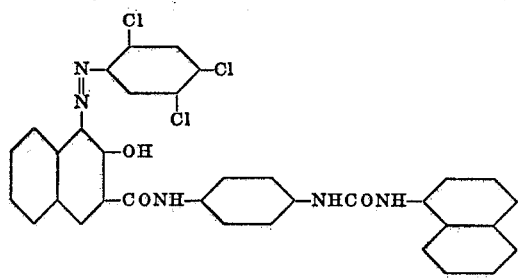

5. The dyestuff as claimed in claim 1 of the formula

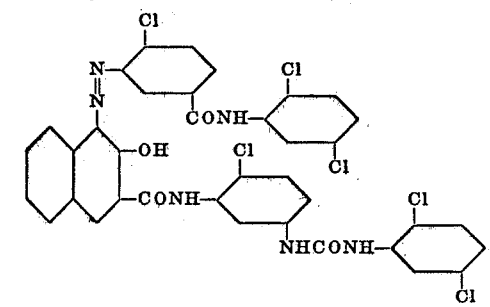

6. The dyestuff as claimed in claim 1 of the formula

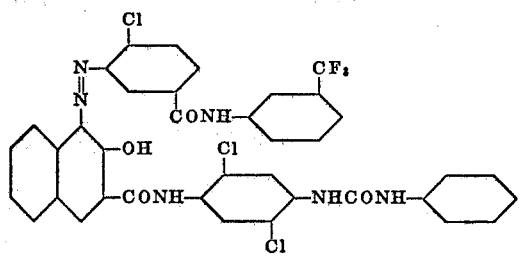

7. The dyestuff as claimed in claim 1 of the formula

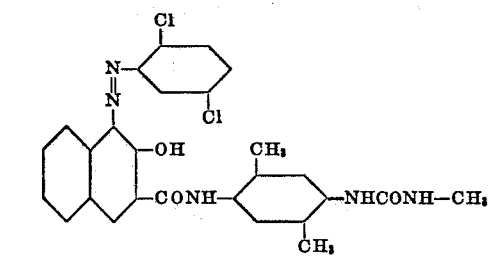

References Cited

UNITED STATES PATENTS 2,199,048   4/1940   Graenacher et al. ____ 260—203

FOREIGN PATENTS 924,518   4/1963   Great Britain.
17,213    7/1956   Germany.

FLOYD D. HIGEL, Primary Examiner

U.S. Cl. X.R.

8—4, 8, 41, 50; 106—288; 117—123, 138.8, 139, 143; 260—37, 41, 202, 204, 465, 471, 518, 520, 553, 574, 578, 764

CASE 5670/E

PO-1050
(5/69)

UNITED STATES PATENT OFFICE
CERTIFICATE OF CORRECTION

Patent No. 3,472,834      Dated October 14, 1969

Inventor(s) Karl Ronco et al

It is certified that error appears in the above-identified patent and that said Letters Patent are hereby corrected as shown below:

Column 14, claim 5, bottom right-hand portion of formula should read:

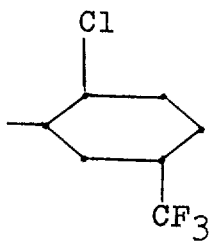

SIGNED AND SEALED
DEC 22 1970

(SEAL)
Attest:

Edward M. Fletcher, Jr.
Attesting Officer

WILLIAM E. SCHUYLER, JR.
Commissioner of Patents